United States Patent
Huh et al.

(10) Patent No.: US 9,365,119 B2
(45) Date of Patent: Jun. 14, 2016

(54) METHOD FOR CALCULATING AMOUNT OF REGENERATIVE BRAKING FOR ENVIRONMENTALLY-FRIENDLY VEHICLE

(71) Applicants: Hyundai Motor Company, Seoul (KR); Kia Motors Corporation, Seoul (KR)

(72) Inventors: Jee Wook Huh, Gyeonggi-Do (KR); Kyoung Cheol Oh, Gyeonggi-Do (KR); Teh Hwan Cho, Gyeonggi-Do (KR); Kyu Hwan Jo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/549,654

(22) Filed: Nov. 21, 2014

(65) Prior Publication Data
US 2016/0001659 A1 Jan. 7, 2016

(30) Foreign Application Priority Data
Jul. 1, 2014 (KR) .................. 10-2014-0082018

(51) Int. Cl.
*G06G 7/00* (2006.01)
*B60L 7/18* (2006.01)
*B60T 8/172* (2006.01)
*B60T 8/52* (2006.01)

(52) U.S. Cl.
CPC . *B60L 7/18* (2013.01); *B60T 8/172* (2013.01); *B60T 8/52* (2013.01)

(58) Field of Classification Search
CPC .............. B60L 7/18; B60T 8/52; B60T 8/172
See application file for complete search history.

(56) References Cited

U.S. PATENT DOCUMENTS

| 5,722,911 A * | 3/1998 | Ibaraki ............... B60K 6/48 180/65.25 |
| 6,209,672 B1 * | 4/2001 | Severinsky ........... B60K 6/442 180/65.23 |
| 2015/0094889 A1 * | 4/2015 | Oh ........................ B60T 13/74 701/22 |

FOREIGN PATENT DOCUMENTS

| JP | 2010-013002 A | 1/2010 |
| JP | 2010-070031 A | 4/2010 |
| JP | 4672061 B2 | 4/2011 |
| JP | 2012-001168 A | 1/2012 |
| JP | 2013-216180 A | 10/2013 |
| KR | 10-1048142 | 7/2011 |

* cited by examiner

*Primary Examiner* — Mary Cheung
(74) *Attorney, Agent, or Firm* — Mintz Levin Cohn Ferris Glovsky and Popeo, P.C.; Peter F. Corless

(57) ABSTRACT

A method for calculating an amount of regenerative braking for an environmentally-friendly vehicle includes: determining a presence of regenerative braking; determining whether charging is limited due to a high voltage component including a battery and a drive motor of the environmentally-friendly vehicle at the time of the regenerative braking for the environmentally-friendly vehicle; calculating a base speed (base rpm) of a driving motor depending on a charging limit in the charging limit state at the time of the regenerative braking for the environmentally-friendly vehicle and dividing a steady torque area and a steady power area based on the calculated base speed; and determining whether an operating mode of the driving motor is a steady power mode, a steady torque mode, or a conversion mode depending on the divided steady torque area or steady torque area and calculating the amount of regenerative braking based on the determined result.

17 Claims, 12 Drawing Sheets

FIG. 7

| Current level / Target level | 6 | 5 | 4 |
|---|---|---|---|
| 5 | 6→5 | | |
| 4 | | 5→4 | |
| 3 | | 5→3 | 4→3 |

METHOD FOR CALCULATING AMOUNT OF REGENERATIVE BRAKING FOR ENVIRONMENTALLY-FRIENDLY VEHICLE

CROSS-REFERENCE TO RELATED APPLICATION

This application claims under 35 U.S.C. §119(a) priority to and the benefit of Korean Patent Application No. 10-2014-0082018 filed in the Korean Intellectual Property Office on Jul. 1, 2014, the entire contents of which are incorporated herein by reference.

BACKGROUND (a) Field of the Invention

The present invention relates to a method for calculating an amount of regenerative braking for an environmentally-friendly vehicle, and more particularly, to a method for calculating an amount of regenerative braking for an environmentally-friendly vehicle capable of improving fuel efficiency and drivability by calculating and applying the amount of regenerative braking based on a state of a high voltage component and a power delivery system and an amount of change of a vehicle speed, for example, a charging limit, a shift level, and deceleration.

(b) Description of the Related Art

As well known to those skilled in the art, environmentally-friendly vehicles such as a hybrid vehicle, an electric vehicle, and a fuel cell vehicle maximize fuel efficiency using a regenerative braking technology.

The regenerative braking technology of the environmentally-friendly vehicle is a technology which applies a counter torque to an electric motor by using energy generated during braking to generate electric energy, stores the generated electric energy in a high voltage battery, and reuses the stored electric energy at the time of driving a vehicle.

In the case of the hybrid vehicle, regenerative braking provides about a 30% fuel efficiency improvement as compared with a conventional vehicle and therefore plays an important part in improving fuel efficiency.

As shown in FIG. 1 (RELATED ART), regenerative braking basically performs braking based on a cooperative control of an electric brake system (EBS) 10 which plays a part in hydraulic braking and a hybrid control unit (HCU) 20.

Referring to FIG. 1, the EBS 10 delivers a regenerative braking tolerance (for example, based on a wheel) based on a demand braking amount of a driver (for example, based on a wheel) to the HCU 20, and the HCU 20 delivers an amount of regenerative braking (based on a wheel) to the EBS 10 and/or a motor control unit (MCU) 30 in consideration of the motor 40, the transmission, and the like.

The EBS 10 performs braking based on the hydraulic (friction) braking using a braking force other than the amount of regenerative braking in the demand braking amount.

However, the regenerative braking relies on an estimate as to how much the braking amount by the motor 40 positioned at a front end of the transmission is actually delivered to the wheel, and therefore the amount of regenerative braking may not be accurately calculated during shifting.

To prevent the above problem from occurring, there is a need to calculate the amount of regenerative braking during shifting based on the amount of regenerative braking before and after the shift. In particular, in order to secure a braking effect, it is important to accurately calculate the braking force of the motor 40 which actually delivers the amount of regenerative braking to the wheel. For this purpose, there is a need to develop logic for the amount of regenerative braking considering a charging limit, a shift level, and a deceleration.

In order to develop the logic for the amount of regenerative braking considering the charging limit, the shift level, and the deceleration, there is a need to consider the following problems of the background and related art.

First, in the motor and the battery which are used for the regenerative braking, charging and discharging may be limited due to various environmental conditions. For example, in the case of the battery, the charging may be limited depending on conditions such as a state of charge (SOC) being too high or low, the temperature being excessively high or low, the battery having a problem, and the like. In the case of the motor, the charging may be limited depending on conditions such as the temperature of the motor being too high, the speed of the motor being too fast, the motor having a problem, and the like.

For example, during the winter season, the charging by the battery may be limited before the battery is preheated, such that the charging of the motor may be limited and the regenerative braking may be limited. In this case, characteristics of the motor are changed and thus the regenerative braking may also be affected.

FIG. 2 (RELATED ART) is a graph illustrating the characteristics of the motor when the charging by the motor is limited and when the charging by the motor is not limited.

When the charging by the motor is not limited, the motor has steady power and steady torque characteristics in a range as shown by a bidirectional solid arrow, but when the charging by the motor is limited, the motor has the steady power and torque characteristics in a range as shown by a bidirectional dotted arrow. In FIG. 2, an area shown by the dotted line is a section in which the torque characteristics of the motor are changed.

As described above, a speed at a point where the torque characteristics of the motor are changed is referred to as a base speed (base Rpm). Consequently, the change in the characteristics of the motor affects the regenerative braking. In particular, when the regenerative braking developed when the charging is not limited is applied to the case in which the charging is limited, the braking effect may be changed.

According to the related art, since the amount of motor braking is calculated without reflecting the charging limit of the motor as described above, the regenerative braking is output too much or output too little at the time of the occurrence of charging limit and thus the hydraulic braking is activated, such that the actual total braking amount may be changed. In this case, a problem of feeling a pushing effect or a sudden effect may be caused.

Second, in the case of a hybrid vehicle equipped with a stepped transmission, a shift is performed during the regenerative braking and the amount of regenerative braking is calculated during the shift, but the logic for the regenerative braking considering the fact that the vehicle has different characteristics depending on a shift stage, that is, the shift level has not yet been applied.

In particular, before and after the shift, a change in a transmission input speed is different depending on an inter-stage ratio (difference between respective stages), but according to the related art, the logic depending on the current shift level is not divided and therefore an error may occur at the time of determining a steady torque area and a steady power area. Therefore, the error occurs in calculating the amount of regenerative braking, which may appear as a change in deceleration effect.

Third, when the vehicle encounters an uphill or a downhill during driving as well as when many people board the vehicle or lots of luggage is loaded in the vehicle, a vehicle load is changed. In this case, even though a driver steps on a brake with equal force, the deceleration of a vehicle is changed. Therefore, there is a need to develop a calculation logic for the amount of regenerative braking considering the deceleration of a vehicle For example, at the time of the change in deceleration (uphill, downhill, and the like), the motor speed variations before and after the shift may be different from a flat area. The change in deceleration occurs because in the case of the downhill, a vehicle speed reduction is small at the same shift time and a difference in a rotation speed (rpm) is small.

However, since the change in deceleration as described above is not reflected to the related art, the amount of regenerative braking is wrongly calculated and thus the change in deceleration effect may occur. In particular, the difference in the transmission input speed occurs before and after the shift at the time of the change in the vehicle load, but in the related art, the difference is not reflected to a calculation condition and map data of the amount of regenerative braking.

The above information disclosed in this Background section is only for enhancement of understanding of the background of the invention and therefore it may contain information that does not form the prior art that is already known in this country to a person of ordinary skill in the art.

SUMMARY

The present invention provides a method for calculating an amount of regenerative braking for an environmentally-friendly vehicle capable of improving fuel efficiency and drivability by calculating and applying the amount of regenerative braking for the environmentally-friendly vehicle based on a state of a high voltage component and a power delivery system and a change amount of a vehicle speed, for example, a charging limit, a shift level, and deceleration.

An exemplary embodiment of the present invention provides a method for calculating an amount of regenerative braking for an environmentally-friendly vehicle, including: determining a presence of regenerative braking for the environmentally-friendly vehicle; determining whether charging is limited due to a high voltage component including a battery and a drive motor of the environmentally-friendly vehicle at the time of the regenerative braking for the environmentally-friendly vehicle; calculating a base speed (base rpm) of a driving motor depending on a charging limit in the charging limit state at the time of the regenerative braking for the environmentally-friendly vehicle and dividing a steady torque area and a steady power area based on the calculated base speed; and determining whether an operating mode of the driving motor is a steady power mode, a steady torque mode, or a conversion mode depending on the divided steady torque area or steady torque area and calculating the amount of regenerative braking based on the determined result.

The base speed of the driving motor may be a speed when characteristics of the driving motor are changed from steady power to steady torque or steady torque to steady power.

The base speed may be calculated by the following equation:

$$N_{Base\ rpm} = Pwr_{MAX\ Mot}/Tq_{MAX\ Mot}$$

$N_{Base\ rpm}$: Base speed (base rpm);
$Pwr_{MAX\ Mot}$: Driving motor maximum power; and
$Tq_{MAX\ Mot}$: Driving motor maximum torque.

The charging limit may include a charging limit due to the driving motor itself and a charging limit due to the battery of the environmentally-friendly vehicle.

The steady power mode may be a case in which a speed of the driving motor is larger than a value obtained by adding a defined first delta rpm to the base speed and the amount of regenerative braking at the steady power mode may be calculated by the following equation:

$$GR_{cal\_Steady\ Power} = \frac{\omega_{TmIn}}{\omega_{TmOut}}$$

$$Regen_{Steady\ Power} = T_{motor} \times GR_{cal}$$

$GR_{cal\_SteadyPower}$ ($=GR_{cal}$): Calculated ratio at steady power mode;
$\omega_{TmIn}$, $\omega_{TmOut}$: Transmission input rotation speed and output rotation speed;
$T_{motor}$: Driving motor torque; and
$Regen_{SteadyPower}$: Amount of regenerative braking at steady power mode.

The steady torque mode may be a case in which a speed of the driving motor is smaller than a value obtained by subtracting a defined second delta rpm (for example, 100 rpm) from the base speed and the amount of regenerative braking at the steady torque mode may be calculated by the following equation:

$$GR_{Diff} = GR_{after} - GR_{before}$$

$$\alpha = \frac{GR_{Diff}}{\Delta T_{Shift}}$$

$$GR_{cal\_Steady\ Torque} = GR_{before} + \int_0^{T_{ShiftEnd}} \alpha\,dT$$

$$Regen_{Steady\ Torque} = T_{motor} \times GR_{cal\_Steady\ Torque}$$

$GR_{after}$, $GR_{before}$: Gear level after shift and before shift;
$GR_{Diff}$: Difference in gear level;
$\Delta T_{Shift}$: Shift time;
$\alpha$: Gear ratio slope at steady torque mode;
$T_{ShiftEnd}$: Shift ending time;

$$GR_{cal\_Steady\ Torque}\left(= \frac{\omega_{TmIn}}{\omega_{TmOut}}\right):$$

Gear ratio; and
$Regen_{SteadyTorque}$: Amount of regenerative braking at steady torque mode.

The conversion mode may be a case in which a speed of the driving motor is smaller than a value obtained by adding a first delta rpm (for example, 200 rpm) to the base speed and larger than a value obtained by subtracting a second delta rpm (for example, 100 rpm) from the base speed as the conversion mode and the amount of regenerative braking at the conversion mode may be calculated by the following equation:

$$GR_{cal\_ModeChange} = GR_{before} + \int_0^{T_{ShiftEnd}} \gamma\,dT$$

$$Regen_{ModeChange} = T_{motor\_virtual} \times GR_{cal\_ModeChange}$$

$GR_{cal\_ModeChange}$: Calculated gear ratio at conversion mode;
$\int_0^{T_{ShiftEnd}} \gamma\,dT$: Slope (increase in gear ratio) of $\gamma$;
$\beta$: Gear ratio slope at conversion mode (mappable constant);
$\gamma$: Currently used slope in $\alpha$ and $\beta$;
$T_{motor\_virtual}$: Virtual motor torque;
$GR_{cal\_ModeChange}$: Calculated slope at conversion mode; and Regen$_{ModeChange}$: Amount of regenerative braking at conversion mode.

Another exemplary embodiment of the present invention provides a method for calculating an amount of regenerative braking for an environmentally-friendly vehicle, including: determining a presence of regenerative braking for the environmentally-friendly vehicle; calculating a base speed (base rpm) of a driving motor of the environmentally-friendly vehicle at the time of the regenerative braking; determining and dividing a steady torque area and a steady power area of the driving motor based on the calculated base speed; detecting a state and a change state of a power delivery system including a transmission of the environmentally-friendly vehicle at the time of the regenerative braking; determining an operating mode of the driving motor determining whether the driving motor is operated in the steady torque area or the steady power area based on the state and the change state of the detected power delivery system; and calculating the amount of regenerative braking based on the steady power mode, the steady torque mode, or the conversion mode determined depending on the determination of the operating mode.

The state of the power delivery system may be whether the transmission is shifted and a current shift level, and the change state of the power delivery system may be whether the transmission is shifted and shifting from the current shift level to a target shift level.

The base speed may be calculated by the following equation.

$$N_{Base\ rpm} = Pwr_{MAX\ Mot}/Tq_{MAX\ Mot}$$

The steady power mode may be a case in which a speed of the driving motor is larger than a value obtained by adding a defined first delta rpm to the base speed and the amount of regenerative braking at the steady power mode may be calculated by the following equation.

$$GR_{cal\_Steady\ Power} = \frac{\omega_{TmIn}}{\omega_{TmOut}}$$

$$Regen_{Steady\ Power} = T_{motor} \times GR_{cal}$$

The steady torque mode may be a case in which a speed of the driving motor is smaller than a value obtained by subtracting a defined second delta rpm from the base speed and the amount of regenerative braking at the steady torque mode may be calculated by the following equation.

$$GR_{Diff} = GR_{after} - GR_{before}$$

$$\alpha = \frac{GR_{Diff}}{\Delta T_{Shift}}$$

$$GR_{cal\_SteadyTorque} = GR_{before} + \int_0^{T_{ShiftEnd}} \alpha dT$$

$$Regen_{SteadyTorque} = T_{motor} \times GR_{cal\_SteadyTorque}$$

The conversion mode may be a case in which a speed of the driving motor is smaller than a value obtained by adding a first delta rpm to the base speed and larger than a value obtained by subtracting a second delta rpm from the base speed as the conversion mode and the amount of regenerative braking at the conversion mode may be calculated by the following equation.

$$GR_{cal\_ModeChange} = GR_{before} + \int_0^{T_{ShiftEnd}} dT$$

$$Regen_{ModeChange} = T_{motor\_virtual} \times GR_{cal\_ModeChange}$$

Yet another exemplary embodiment of the present invention provides a method for calculating an amount of regenerative braking for an environmentally-friendly vehicle, including: determining a presence of regenerative braking for the environmentally-friendly vehicle; calculating a base speed (base rpm) of a driving motor of the environmentally-friendly vehicle and a vehicle speed variation of the environmentally-friendly vehicle at the time of the regenerative braking; determining and dividing a steady torque area and a steady power area of the driving motor based on the calculated base speed and vehicle speed variation; and determining whether an operating mode of the driving motor is a steady power mode, a steady torque mode, or a conversion mode depending on the divided steady torque area or steady torque area and calculating the amount of regenerative braking based on the determined result.

The vehicle speed variation may be obtained by differentiating the vehicle speed of the environmentally-friendly vehicle.

The steady torque mode may be a case in which the vehicle speed variation is larger than a predetermined first set value as a case in which the deceleration is large.

The steady power mode may be a case in which the vehicle speed variation is smaller than a predetermined second set value as a case in which the deceleration is small.

The conversion mode may be a case in which the vehicle speed variation is smaller than a predetermined first set value and larger than a predetermined second set value.

As described above, according to an exemplary embodiment of the present invention, it is possible to solve the problem of the change in braking effect, the occurrence of shock, and the like which occur at the time of the shift during the braking when there is no charging limit since the amount of regenerative braking is calculated in consideration of whether the charging is limited and remove the aggravating factors of fuel efficiency such as the sudden change in brake oil pressure, the aggravation of braking linearity, and the impossibility of accurate estimation of the regenerative braking amount, due to the sudden change in regenerative braking.

According to an exemplary embodiment of the present invention, it is possible to solve the problem of the change in braking effect at the time of shifting during braking by calculating the amount of regenerative braking in consideration of the shift level.

According to an exemplary embodiment of the present invention, it is possible to improve braking linearity and drivability by calculating the amount of regenerative braking in consideration of the deceleration (or, vehicle speed change rate).

BRIEF DESCRIPTION OF THE DRAWINGS

FIG. 7 is a diagram illustrating a relationship of a shift level used for the method for calculating an amount of regenerative braking for an environmentally-friendly vehicle according to the exemplary embodiment of the present invention.

DETAILED DESCRIPTION OF THE EMBODIMENTS

Hereinafter, the present invention will be described more fully hereinafter with reference to the accompanying drawings, in which exemplary embodiments of the invention are shown. However, the present disclosure is not limited to the exemplary embodiments set forth herein, but may be modified in many different forms.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 3:
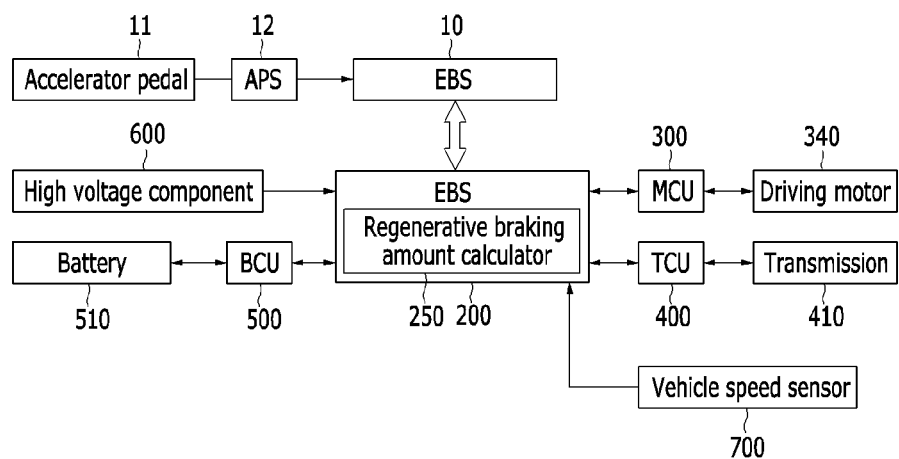
FIG. 3 is a block diagram schematically illustrating a system for implementing a method for calculating an amount of regenerative braking for an environmentally-friendly vehicle according to an exemplary embodiment of the present invention.

FIG. 3 is a diagram schematically illustrating a system for implementing a method for calculating an amount of regenerative braking for an environmentally-friendly vehicle according to an exemplary embodiment of the present invention.

As illustrated in FIG. 3, the system for implementing the method for calculating the amount of regenerative braking according to the exemplary embodiment of the present invention may include: a regenerative braking amount calculator 250, a hybrid control unit 200 configured to control a hybrid vehicle; an electronic brake system (EBS) 10 configured to receive a signal of an accelerator position sensor (APS) 12 linked with an operation of an accelerator pedal 11 and perform a brake control; a motor control unit (MCU) 300 configured to control a drive motor 340; a transmission control unit (TCU) 400 configured to control a transmission 410; and a battery control unit (BCU) 500 configured to manage and control a battery 510. The hybrid control unit 200 may transmit and receive a signal to and from a high voltage component 600 and receive a signal of a vehicle speed sensor 700.

The motor control unit 300, the transmission control unit 400, the battery control unit 500, and the electronic brake system 10, which are connected to the hybrid control unit 200 to perform a cooperative control, are components which are generally equipped in a hybrid vehicle and therefore a detailed description thereof will be omitted.

The regenerative braking amount calculator 250 and/or the hybrid controller 200 include at least one microprocessor and/or hardware including the microprocessor which are operated by a predetermined program, and the predetermined program may be formed of a series of commands for performing the method for calculating an amount of regenerative braking according to the exemplary embodiment of the present invention.

According to the exemplary embodiment of the present invention, it will be apparent to those skilled in the art that the regenerative braking amount calculator 250 may be configured as a portion of the hybrid control unit 200.

Hereinafter, the method for calculating the amount of regenerative braking for the environmentally-friendly vehicle according to the exemplary embodiment of the present invention will be described with reference to the accompanying drawings.

The method for calculating the amount of regenerative braking for the environmentally-friendly vehicle according to the exemplary embodiment of the present invention considers a charging limit, a shift level, and a vehicle load.

Figure 4:
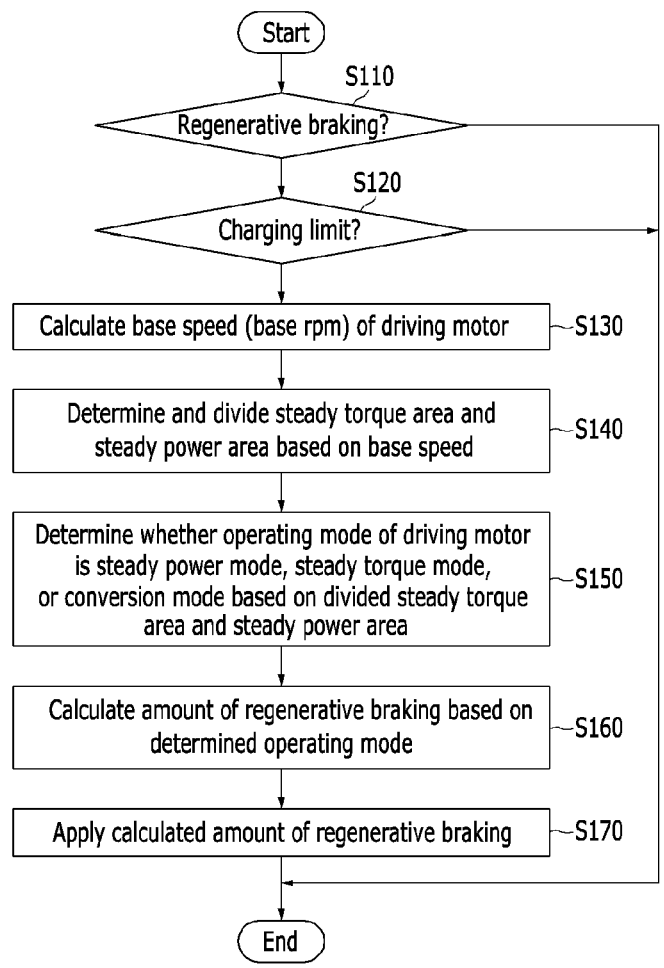
FIG. 4 is a flow chart of the method for calculating an amount of regenerative braking for an environmentally-friendly vehicle according to the exemplary embodiment of the present invention.

FIG. 4 is a flow chart of a method for calculating an amount of regenerative braking for an environmentally-friendly vehicle according to a first exemplary embodiment of the present invention.

The first exemplary embodiment of the present invention can accurately calculate an amount of regenerative braking based on whether the charging is limited during braking.

As illustrated in FIG. 4, the hybrid control unit 200 determines regenerative braking for the hybrid vehicle as the environmentally-friendly vehicle (S110). A technology of determining whether the hybrid control unit 200 performs regenerative braking for the hybrid vehicle may be easily performed by those skilled in the art, and therefore a detailed description thereof will be omitted.

When the regenerative braking for the environmentally-friendly vehicle is confirmed, the hybrid control unit 200 determines whether the charging is limited due to the battery 510, the driving motor 340, and/or the high voltage component 600 of the environmentally-friendly vehicle (S120). The determination as to whether the charging of the environmentally-friendly vehicle is limited may be easily performed by those skilled in the art based on the existing technology, and therefore a detailed description thereof will be omitted.

For example, in the case of the battery, the charging may be limited depending on conditions such when a state of charge (SOC) is too high or low, the temperature is too high or low, or the battery has a problem, and in the case of the driving motor, the charging may be limited depending on conditions such as when the temperature of the driving motor is too high, a speed of the driving motor is too fast, or the driving motor has a problem. For example, during the winter season, the charging by the battery may be limited before the battery is preheated, such that the charging by the driving motor may be limited and the regenerative braking may be limited.

As the determination result in step S120, in the charging limit state, the hybrid control unit 200 calculates the base speed (base rpm) of the driving motor 340 depending on the charging limit and divides a steady torque area and a steady power area of the driving motor 340 based on the calculated base speed (S130 and S140).

The charging limit may include the charging limit due to the drive motor 340 itself and the charging limit due to the battery 510, and in order to confirm the charging limit, the hybrid control unit 200 may transmit and receive a signal to and from the MCU 300 and the BCU 500.

The hybrid control unit 200 may calculate a base speed $N_{Base\_rpm}$ based on the following equation:

$$N_{Base\,rpm} = Pwr_{MAX\,Mot}/Tq_{MAX\,Mot}$$

$Pwr_{MAX\,Mot}$: Driving motor maximum power; and
$Tq_{MAX\,Mot}$: Driving motor maximum torque.

Figure 1:
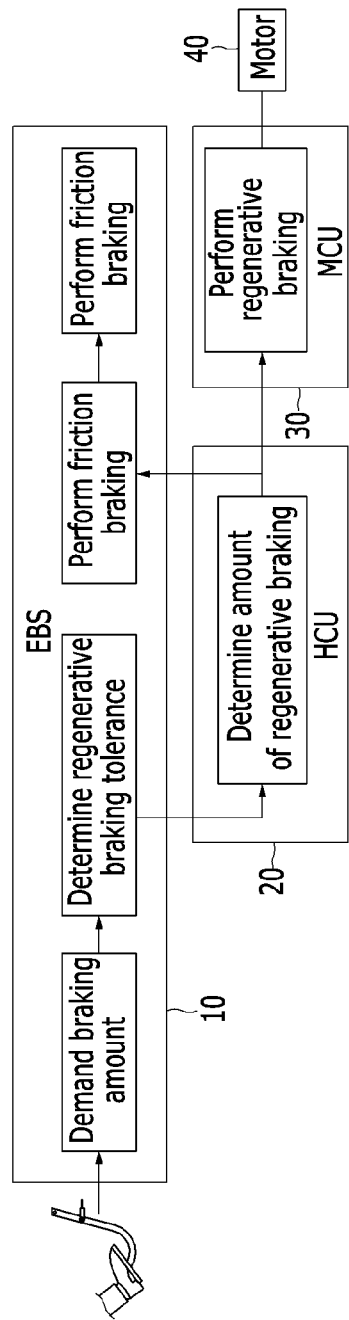
FIG. 1 (RELATED ART) is a block diagram illustrating a cooperative control relationship of an electric brake system (EBS) and a hybrid control unit (HCU) for general regenerative braking.
Figure 2:
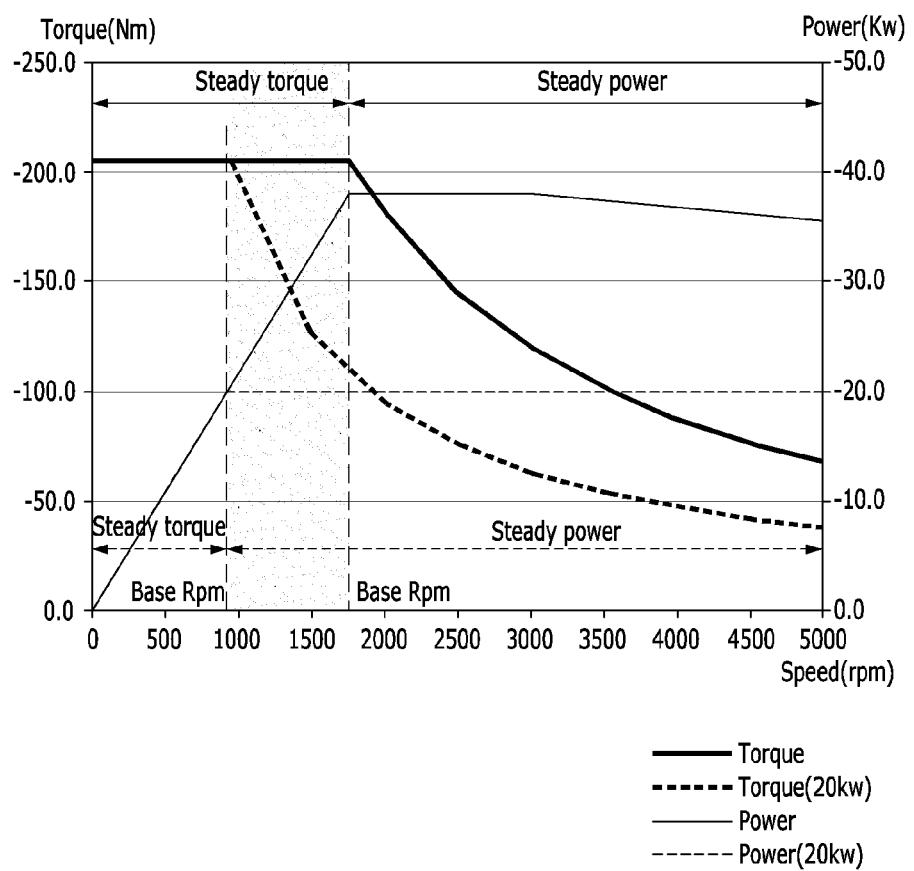
FIG. 2 (RELATED ART) is a graph illustrating characteristics of a motor when the charging by the motor is limited and when the charging by the motor is not limited.

When the base speed is calculated as described above, as illustrated in FIG. 2, the hybrid control unit 200 determines and divides the steady torque area and the steady power area of the driving motor 340 based on the base speed (S140).

In step S140, when the steady torque area and the steady power area are divided, the hybrid control unit 200 confirms whether an operation of the driving motor 340 is in the steady torque area or the steady power area or alternates between the steady torque area and the steady power area (S150). In particular, the hybrid control unit 200 determines whether an operating mode of the driving motor 340 is a steady power mode, a steady torque mode, or a conversion mode (S150).

Figure 8:
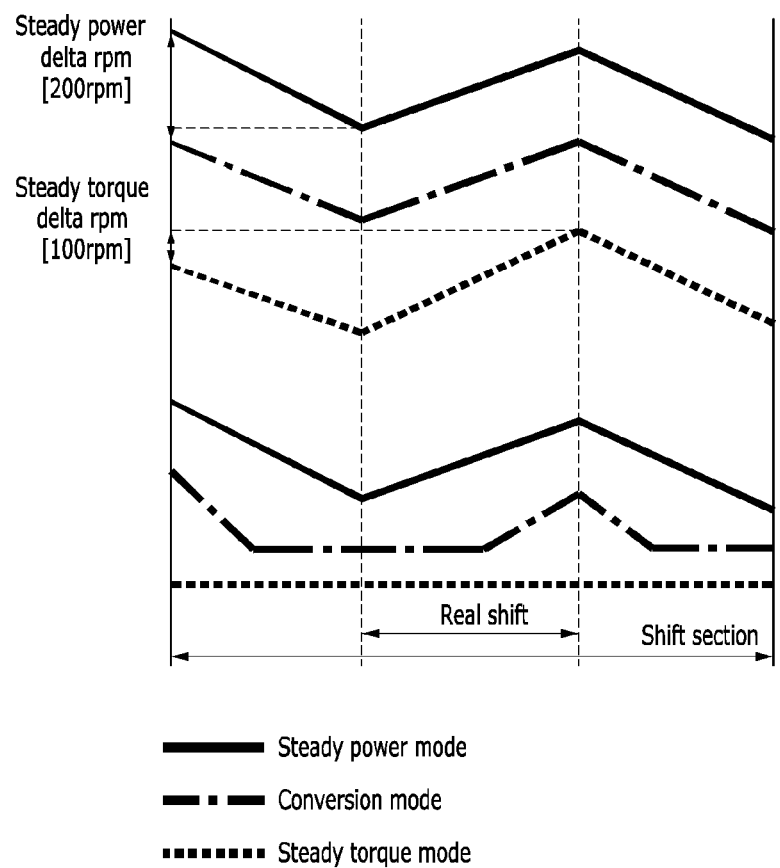
FIGS. 8 to 12 are graphs for describing an operation of the method for calculating an amount of regenerative braking for an environmentally-friendly vehicle according to the exemplary embodiment of the present invention.

For example, as illustrated in FIG. 8, the hybrid control unit 200 determines the case in which the speed of the driving motor 340 is larger than a value obtained by adding a defined delta rpm (for example, 200 rpm) to the base speed as the steady power mode, determines the case in which the speed of the driving motor 340 is smaller than a value obtained by subtracting a defined second delta rpm (for example, 100 rpm) from the base speed as the steady torque mode, and determines the case in which the speed of the driving motor 340 is smaller than the value obtained by adding the first delta rpm to the base speed and larger than the value obtained by subtracting the second delta rpm from the base speed as the conversion mode.

As described above, when the operating mode of the driving motor 340 is determined, the regenerative braking amount calculator 250 calculates the amount of regenerative braking based on the determination result of the operating mode and applies the calculated amount of regenerative braking (S160 and S170).

Figure 9:
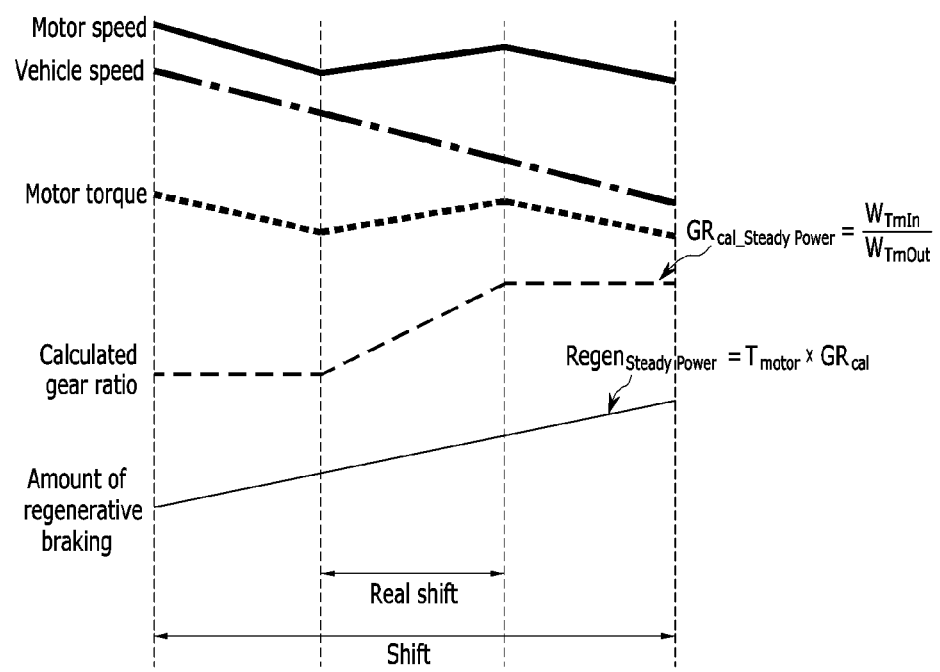
Figure 10:
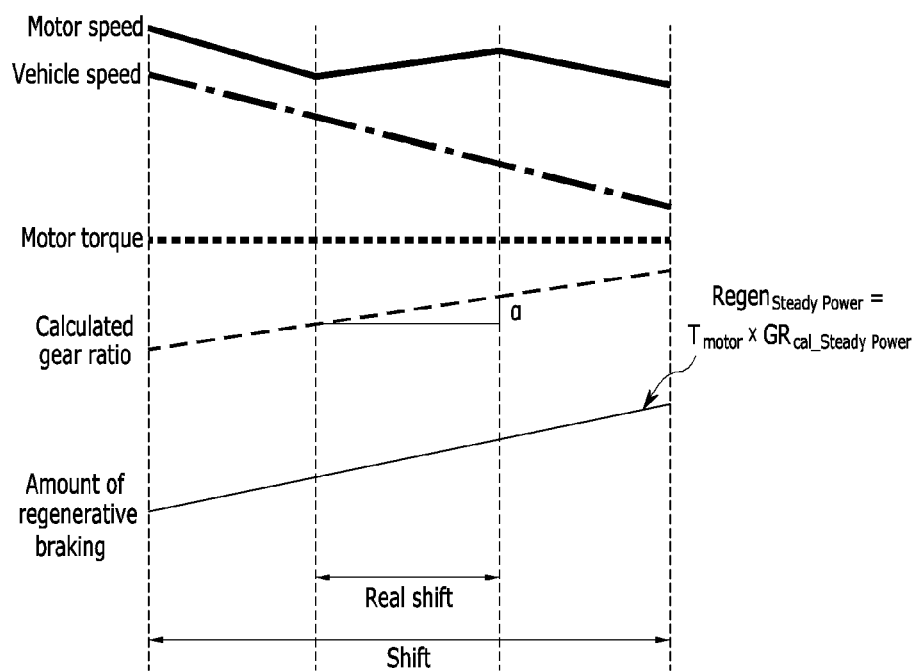
Figure 11:
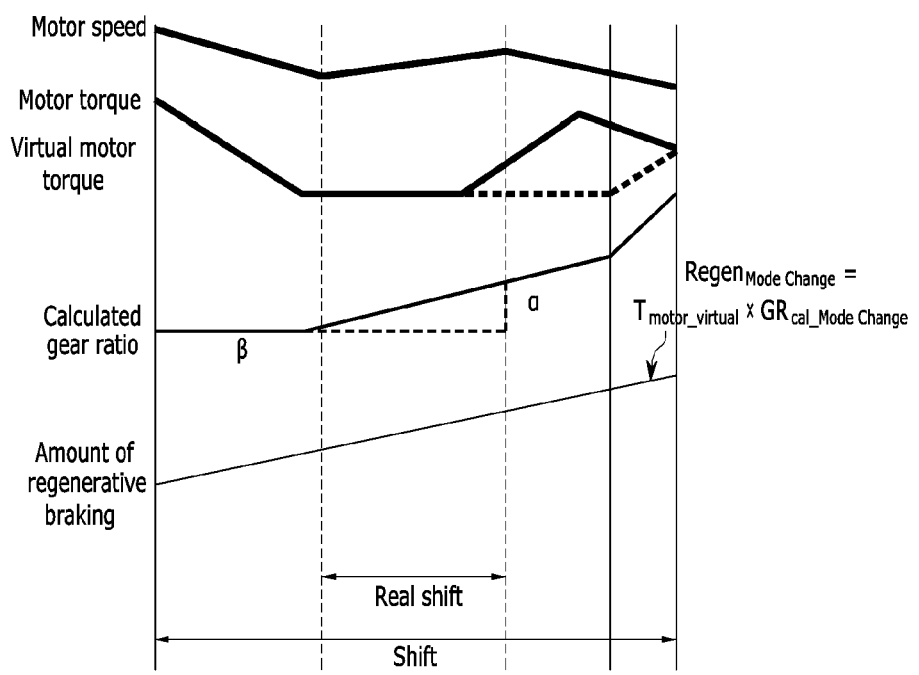

For example, the regenerative braking amount calculator 250 may calculate the amount of regenerative braking based on FIGS. 9 to 11 and the following equation.

In particular, when the driving motor 340 is operated in the steady power mode in the steady power area, the regenerative braking amount calculator 250 may calculate an amount $Regen_{SteadyPower}$ of regenerative braking based on the following Equations 1 and 2, when the driving motor 340 is operated in the steady torque mode in the steady torque area, the regenerative braking amount calculator 250 may calculate an amount $Regen_{SteadyTorque}$ of regenerative braking based on the following Equations 3 to 6, and when the driving motor 340 is operated as the conversion motor, the regenerative braking amount calculator 250 may calculate an amount $Regen_{ModeChange}$ of regenerative braking based on the following Equations 7 and 8.

$$GR_{cal\_SteadyPower} = \frac{\omega_{TmIn}}{\omega_{TmOut}} \qquad 1$$

$$GR_{cal\_Steady\,Power} = \frac{\omega_{TmIn}}{\omega_{TmOut}}$$

$$Regen_{Steady\,Power} = T_{motor} \times GR_{cal} \qquad 2$$

$$Regen_{Steady\,Power} = T_{motor} \times GR_{cal}$$

$GR_{cal\_SteadyPower}$ (=$GR_{cal}$): Calculated gear ratio at steady power mode
$\omega_{TmIn}$, $\omega_{TmOut}$: Transmission input rotation speed, output rotation speed
$T_{motor}$: Driving motor torque
$Regen_{SteadyPower}$: Amount of regenerative braking at steady power mode $$GR_{Diff} = GR_{after} - GR_{before} \qquad 3$$

$$\alpha = \frac{GR_{Diff}}{\Delta T_{Shift}} \qquad 4$$

$$GR_{cal\_Steady\,Torque} = GR_{before} + \int_0^{T_{ShiftEnd}} \alpha dT \qquad 5$$

$$Regen_{SteadyTorque} = T_{motor} \times GR_{cal\_SteadyTorque} \qquad 6$$

$GR_{after}$, $GR_{before}$: Gear level after shifting and before shifting
$GR_{Diff}$: Difference in gear level
$\Delta T_{Shift}$: Shifting time
$\alpha$: Mappable variable as gear ratio slope at steady torque mode
$T_{ShiftEnd}$: Shift ending time $$GR_{cal\_SteadyTorque}\left(=\frac{\omega_{TmIn}}{\omega_{TmOut}}\right):$$

Gear ratio
$Regen_{SteadyTorque}$: Amount of regenerative braking at steady torque mode $$GR_{cal\_ModeChage} = GR_{before} + \int_0^{T_{ShiftEnd}} \gamma dT \qquad 7$$

$$Regen_{ModeChange} = T_{motor\_virtual} \times GR_{cal\_ModeChange} \qquad 8$$

$GR_{cal\_ModeChange}$: Calculated gear ratio at conversion mode $\int_0^{TShiftEnd} \gamma dT$: Slope (increase in gear ratio) of $\gamma$ β: Mappable constant as gear ratio slope at conversion mode γ: Currently used slope in α and β

$T_{motor\_virtual}$: Virtual motor torque $GR_{cal\_ModeChange}$: Calculated slope at conversion mode $Regen_{ModeChange}$: Amount of regenerative braking at conversion mode According to the first exemplary embodiment of the present invention as described above, since the base rpm of the driving motor is continuously changed at the time of the charging limit by the high voltage component (for example, driving motor, battery, and the like), three operating modes of the driving motor are determined in consideration of the change to be able to accurately secure the amount of regenerative brake. In particular, according to the first exemplary embodiment of the present invention, for example, the steady power area, the steady torque mode, and the mode of the mode conversion may be accurately determined by, for example, certainly dividing the steady torque area and the steady power area based on the calculated base rpm depending on the charging limit of the driving motor, such that the amount of regenerative braking may be accurately calculated.

Figure 5:
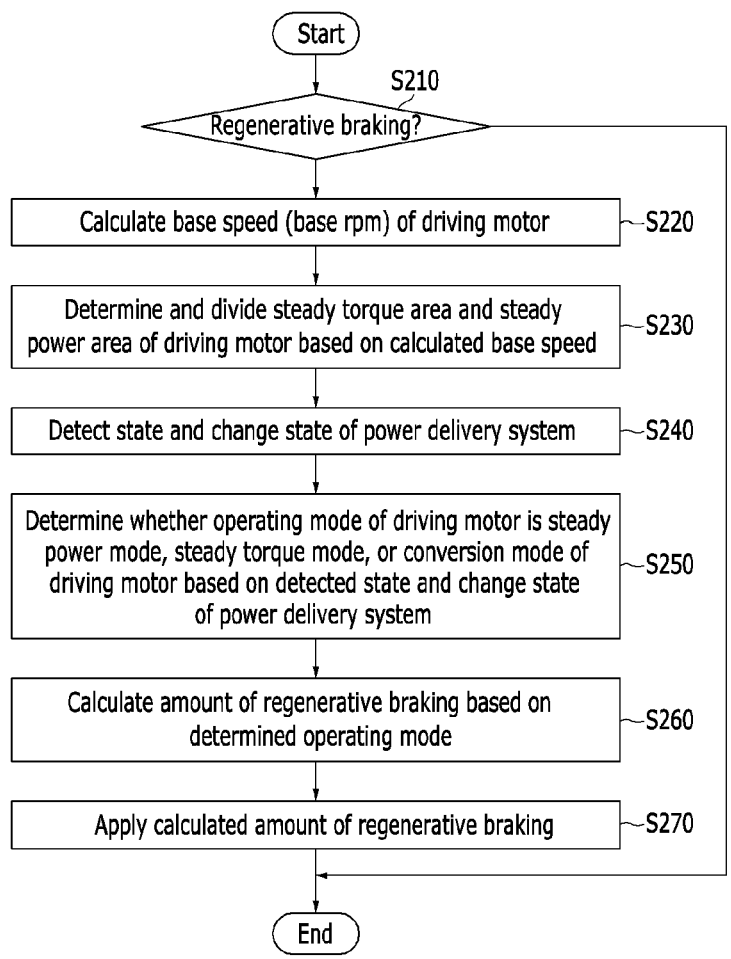
FIG. 5 is a flow chart of a method for calculating an amount of regenerative braking for an environmentally-friendly vehicle according to another exemplary embodiment of the present invention.

FIG. 5 is a flow chart of a method for calculating an amount of regenerative braking for an environmentally-friendly vehicle according to a second exemplary embodiment of the present invention.

The second exemplary embodiment of the present invention can accurately determine the operating mode of the driving motor based on the shift level during the braking and accurately calculate the amount of regenerative braking based thereon.

As illustrated in FIG. 5, the hybrid control unit 200 determines regenerative braking of the hybrid vehicle as the environmentally-friendly vehicle (S210).

When the regenerative braking is confirmed, the hybrid control unit 200 calculates the base speed (base rpm) of the driving motor 340 of the environmentally-friendly vehicle (S220). The hybrid control unit 200 may calculate the base speed based on the cooperative control with the motor control unit 300.

The hybrid control unit 200 may calculate a base speed $N_{Baserpm}$ by, for example, the following equation.

$$N_{Base\ rpm} = Pwr_{MAX Mot}/Tq_{MAX Mot}$$

When the base speed is calculated as described above, as illustrated in FIG. 2, the hybrid control unit 200 determines and divides the steady torque area and the steady power area of the driving motor 340 based on the base speed (S230).

When the steady torque area and the steady power area are determined and divided, the hybrid control unit 200 detects a current level and a target level of the transmission 410 configuring the power delivery system, and a relationship before the shift and after the shift, and the like as illustrated in FIG. 7, and the like (S240).

According to the second exemplary embodiment of the present invention, as described above, the reason for detecting the relationship of the speed of the driving motor before and after the shift, and the like is that the accurate determination may be made only when the difference in the speed of the driving motor 340 before and after the shifting is determined in order to determine the operating mode depending on the speed of the driving motor 340. In particular, since the speed of the driving motor 340 before and after the shift for each stage is different at the time of the shifting, there is a need to calculate the amount of regenerative braking in consideration of this. It is apparent to those skilled in the art that the shift mode may be determined based on the target shift level and the current shift level.

In order to determine the relationship of the speed of the drive motor before and after the shift, it is apparent to those skilled in the art that the hybrid control unit 200 may perform the cooperative control with the transmission control unit 400.

As described above, when the base speed of the driving motor 340 is calculated and the current level and the target level of the transmission, the speed relationship of the driving motor 340 before and after the shifting are detected, the hybrid control unit 200 determines whether the driving motor 340 is operated in the steady torque area, the steady power area, or alternates the steady torque area and the steady power area based thereon (S250). In particular, the hybrid control unit 200 determines whether an operating mode of the driving motor 340 is the steady power mode, the steady torque mode, or the conversion mode (S250).

For example, as illustrated in FIG. 8, the hybrid control unit 200 determines the case in which the speed of the driving motor 340 is larger than a value obtained by adding a defined delta rpm (for example, 200 rpm) to the base speed as the steady power mode, determines the case in which the speed of the driving motor 340 is smaller than a value obtained by subtracting a defined second delta rpm (for example, 100 rpm) from the base speed as the steady torque mode, and determines the case in which the speed of the driving motor 340 is smaller than the value obtained by adding the first delta rpm to the base speed and larger than the value obtained by subtracting the second delta rpm from the base speed as the conversion mode.

As described above, when the operating mode of the driving motor 340 is determined, the regenerative braking amount calculator 250 calculates the amount of regenerative braking based on the determination result of the operating mode and applies the calculated amount of regenerative braking (S260 and S270).

For example, the regenerative braking amount calculator 250 may calculate the amount of regenerative braking considering the shift level based on FIGS. 9 to 11 and the following equation.

In particular, when the driving motor 340 is operated in the steady power mode in the steady power area, the regenerative braking amount calculator 250 may calculate an amount $Regen_{SteadyPower}$ of regenerative braking based on the following Equations 1 and 2, when the driving motor 340 is operated in the steady torque mode in the steady torque area, the regenerative braking amount calculator 250 may calculate an amount $Regen_{SteadyTorque}$ of regenerative braking based on the following Equations 3 to 6, and when the driving motor 340 is operated as the conversion motor, the regenerative braking amount calculator 250 may calculate an amount $Regen_{ModeChange}$ of regenerative braking based on the following Equations (7) and (8).

$$GR_{cal\_Steady\ Power} = \frac{\omega_{TmIn}}{\omega_{TmOut}} \quad\quad 1$$

$$Regen_{Steady\ Power} = T_{motor} \times GR_{cal} \quad\quad 2$$

$$GR_{Diff} = GR_{after} - GR_{before} \quad\quad 3$$

$$\alpha = \frac{GR_{Diff}}{\Delta T_{Shift}} \quad\quad 4$$

-continued $$GR_{cal\_SteadyTorque} = GR_{before} + \int_0^{T_{ShiftEnd}} \alpha dT \quad 5$$

$$Regen_{SteadyTorque} = T_{motor} \times GR_{cal\_SteadyTorque} \quad 6$$

$$GR_{cal\_ModeChange} = GR_{before} + \int_0^{T_{ShiftEnd}} \gamma dT \quad 7$$

$$Regen_{ModeChange} = T_{motor\_virtual} \times GR_{cal\_ModeChange} \quad 8$$

According to the second exemplary embodiment of the present invention as described above, since the speeds of the driving motor before and after the shifting are different from each other for each level, the accurate amount of regenerative braking may be calculated by considering this, that is, binarizing the speed of the driving motor before and after the shifting for each shift.

Figure 6:
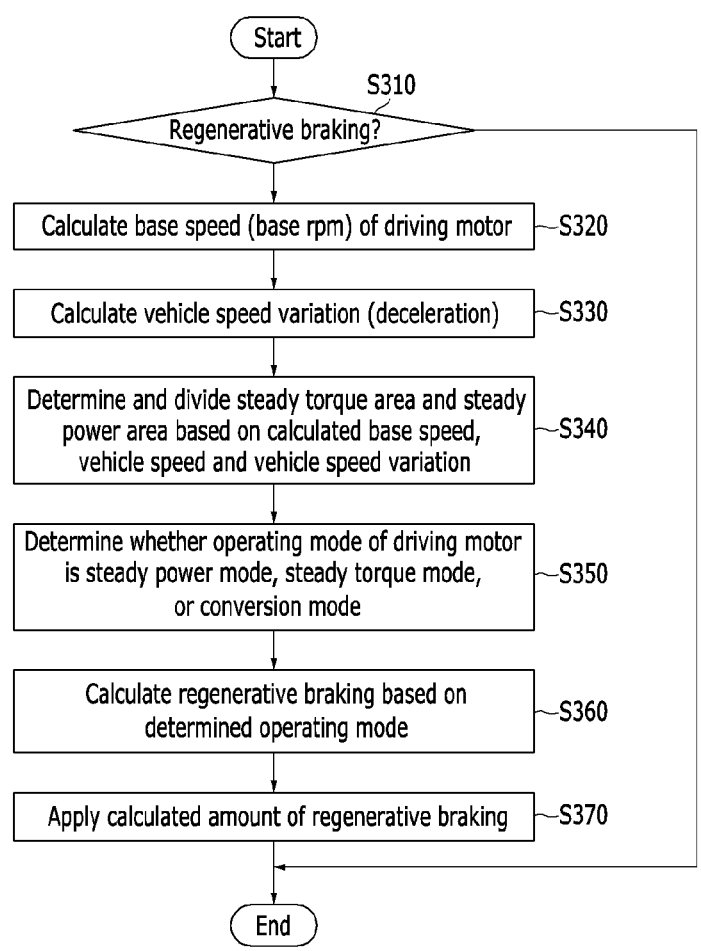
FIG. 6 is a flow chart of a method for calculating an amount of regenerative braking for an environmentally-friendly vehicle according to still another exemplary embodiment of the present invention.

FIG. 6 is a flow chart of a method for calculating an amount of regenerative braking for an environmentally-friendly vehicle according to a third exemplary embodiment of the present invention.

The third exemplary embodiment of the present invention is an exemplary embodiment of accurately determining the operating mode of the driving motor based on the vehicle speed variation (for example, deceleration) during the braking and accurately calculate the amount of regenerative braking based thereon.

As illustrated in FIG. 6, the hybrid control unit 200 determines the regenerative braking of the hybrid vehicle as the environmentally-friendly vehicle (S310).

When the regenerative braking is confirmed, the hybrid control unit 200 calculates the base speed (base rpm) of the driving motor 340 of the environmentally-friendly vehicle (S320).

The hybrid control unit 200 may calculate the base speed based on the cooperative control with the motor control unit 300.

The hybrid control unit 200 may calculate a base speed $N_{Baserpm}$ by, for example, the following equation. $N_{Base\,rpm}$ $$N_{Base\,rpm} = Pwr_{MAX\,Mot}/Tq_{MAX\,Mot}$$

When the base speed is calculated as described above, the hybrid control unit 200 calculates the vehicle speed variation detected by the vehicle speed sensor 700 (S330).

For example, the hybrid control unit 200 may differentiate the vehicle speed for calculating the vehicle speed variation.

When the base speed and the vehicle speed variation are calculated as described above, the hybrid control unit 200 determines and divides the steady torque area and the steady power area of the driving motor 340 based on the calculated base speed and vehicle speed variation (S340).

At the time of determining and dividing the steady torque area and the steady power area, the vehicle speed variation is associated with the shift situation and therefore the shift situation may be considered.

According to the third exemplary embodiment of the present invention, the reason for calculating and considering the vehicle speed variation, that is, the deceleration at the time of the regenerative braking is that the speed of the driving motor 340 is changed depending on the vehicle speed variation (deceleration) and thus affects the operating mode of the driving motor 340.

For example, since the slope of the speed of the driving motor 340 is changed during the shift at the time of the change in deceleration, when a mode set based on normal braking and a flat area is applied, the mode may be wrongly determined during sudden braking and uphill/downhill. To this end, the mode determination needs to be binarized at the time of change in the deceleration by calculating the deceleration.

In step S340, when the steady torque area and the steady power area are divided, the hybrid control unit 200 determines whether the operating mode of the driving motor 340 is the steady power mode, the steady torque mode, or the conversion mode based on the deceleration (S350).

Figure 12:
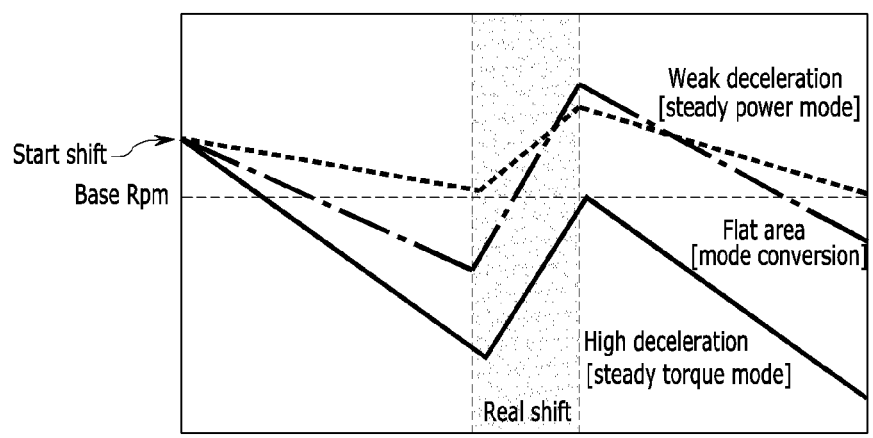

For example, as illustrated in FIG. 12, the hybrid control unit 200 may determine that the drive motor 340 is the steady torque mode when the deceleration is large, that is, when the vehicle speed variation is larger than a predetermined first set value, determine that the driver motor 340 is the steady power mode when the deceleration is small, that is, when the vehicle speed variation is a predetermined second set value, and determine that the drive motor 340 is the conversion mode when the vehicle speed variation is smaller than the predetermined first set value and larger than the predetermined second set value.

The predetermined first set value and second set value may be obtained by a combination of constants which may determine the delta rpm and the experiment.

As described above, when the operating mode of the driving motor 340 is determined, the regenerative braking amount calculator 250 calculates the amount of regenerative braking based on the determination result of the operating mode and applies the calculated amount of regenerative braking (S360 and S370).

According to the third exemplary embodiment of the present invention as described above, it is possible to improve the drivability at the time of the sudden acceleration and the uphill/downhill by calculating the amount of regenerative braking in consideration of the vehicle speed variation (deceleration).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling regenerative braking for an environmentally-friendly vehicle, comprising:
   determining, by a hybrid controller, a presence of regenerative braking for the environmentally-friendly vehicle;
   determining, by the hybrid controller, whether charging is limited due to a high voltage component including a battery and a drive motor of the environmentally-friendly vehicle at the time of the regenerative braking for the environmentally-friendly vehicle;
   calculating, by the hybrid controller, a base speed (base rpm) of a driving motor depending on a charging limit in a charging limit state at the time of the regenerative braking for the environmentally-friendly vehicle and dividing a steady torque area and a steady power area based on the calculated base speed;
   determining, by the hybrid controller, whether an operating mode of the driving motor is a steady power mode, a steady torque mode, or a conversion mode depending on the divided steady torque area or steady torque area and calculating an amount of regenerative braking based on the determined result; and
   controlling, by the hybrid controller, regenerative braking for the environmentally-friendly vehicle based on the calculated amount of regenerative braking, wherein the base speed of the driving motor is a speed when characteristics of the driving motor are changed from steady power to steady torque or steady torque to steady power.

2. The method of claim 1, wherein:
the base speed is calculated by the following equation:

$$N_{Base\ rpm} = Pwr_{MAX\ Mot}/Tq_{MAX\ Mot}$$

$N_{Base\ rpm}$: Base speed (base rpm);
$Pwr_{MAX\ Mot}$: Driving motor maximum power; and
$Tq_{MAX\ Mot}$: Driving motor maximum torque.

3. The method of claim 1, wherein the charging limit includes a charging limit due to the driving motor itself and a charging limit due to the battery of the environmentally-friendly vehicle.

4. The method of claim 1, wherein the steady power mode is a case in which a speed of the driving motor is larger than a value obtained by adding a defined first delta rpm to the base speed, and the amount of regenerative braking at the steady power mode is calculated by the following equation:

$$GR_{cal\_Steady\ Power} = \frac{\omega_{TmIn}}{\omega_{TmOut}}$$

$$Regen_{Steady\ Power} = T_{motor} \times GR_{cal}$$

$GR_{cal\_SteadyPower}$ ($=GR_{cal}$): Calculated ratio at steady power mode;
$\omega_{TmIn}, \omega_{TmOut}$: Transmission input rotation speed and output rotation speed;
$T_{motor}$: Driving motor torque; and
$Regen_{SteadyPower}$: Amount of regenerative braking at steady power mode.

5. The method of claim 1, wherein:
the steady torque mode is a case in which a speed of the driving motor is smaller than a value obtained by subtracting a defined second delta rpm from the base speed, and
the amount of regenerative braking at the steady torque mode is calculated by the following equation:

$$GR_{Diff} = GR_{after} - GR_{before}$$

$$\alpha = \frac{GR_{Diff}}{\Delta T_{Shift}}$$

$$GR_{cal\_Steady\ Torque} = GR_{before} + \int_0^{T_{ShiftEnd}} \alpha dT$$

$$Regen_{Steady\ Torque} = T_{motor} \times GR_{cal\_Steady\ Torque}$$

$GR_{after}, GR_{before}$: Gear level after shift and before shift;
$GR_{Diff}$: Difference in gear level;
$\Delta T_{Shift}$: Shift time;
$\alpha$: Gear ratio slope at steady torque mode;
$T_{ShiftEnd}$: Shift ending time;

$$GR_{cal\_Steady\ Torque}\left(=\frac{\omega_{TmIn}}{\omega_{TmOut}}\right):$$

Gear ratio; and
$Regen_{SteadyTorque}$: Amount of regenerative braking at steady torque mode.

6. The method of claim 1, wherein the conversion mode is a case in which a speed of the driving motor is smaller than a value obtained by adding the first delta rpm to the base speed and larger than a value obtained by subtracting the second delta rpm from the base speed as the conversion mode, and the amount of regenerative braking at the conversion mode is calculated by the following equation:

$$GR_{cal\_ModeChange} = GR_{before} + \int_0^{T_{ShiftEnd}} \gamma dT$$

$$Regen_{ModeChange} = T_{motor\_virtual} \times GR_{cal\_ModeChange}$$

$GR_{cal\_ModeChange}$: Calculated gear ratio at conversion mode;
$\int_0^{T_{ShiftEnd}} \gamma dT$: Slope (increase in gear ratio) of $\gamma$;
$\beta$: Gear ratio slope at conversion mode (mappable constant);
$\gamma$: Currently used slope in $\alpha$ and $\beta$;
$T_{motor\_virtual}$: Virtual motor torque;
$GR_{cal\_ModeChange}$: Calculated slope at conversion mode; and
$Regen_{ModeChange}$: Amount of regenerative braking at conversion mode.

7. A method of controlling regenerative braking for an environmentally-friendly vehicle, comprising:
determining, by a hybrid controller, a presence of regenerative braking for the environmentally-friendly vehicle;
calculating, by the hybrid controller, a base speed (base rpm) of a driving motor of the environmentally-friendly vehicle at the time of the regenerative braking;
determining and dividing, by the hybrid controller, a steady torque area and a steady power area of the driving motor based on the calculated base speed;
detecting, by the hybrid controller, a state and a change state of a power delivery system including a transmission of the environmentally-friendly vehicle at the time of the regenerative braking;
determining, by the hybrid controller, an operating mode of the driving motor determining whether the driving motor is operated in the steady torque area or the steady power area based on the state and the change state of the detected power delivery system;
calculating, by the hybrid controller, an amount of regenerative braking based on the steady power mode, the steady torque mode, or the conversion mode determined depending on the determination of the operating mode; and
controlling, by the hybrid controller, regenerative braking for the environmentally-friendly vehicle based on the calculated amount of regenerative braking,
wherein the base speed of the driving motor is a speed when characteristics of the driving motor are changed from steady power to steady torque or steady torque to steady power.

8. The method of claim 7, wherein the state of the power delivery system is whether the transmission is shifted and a current shift level, and the change state of the power delivery system is whether the transmission is shifted and shifting from the current shift level to a target shift level.

9. The method of claim 8, wherein the base speed is calculated by the following equation:

$$N_{Base\ rpm} = Pwr_{MAX\ Mot}/Tq_{MAX\ Mot}$$

$N_{Base\ rpm}$: Base speed (base rpm);
$Pwr_{MAX\ Mot}$: Driving motor maximum power; and
$Tq_{MAX\ Mot}$: Driving motor maximum torque.

10. The method of claim 9, wherein the steady power mode is a case in which a speed of the driving motor is larger than a value obtained by adding a defined first delta rpm to the base speed, and the amount of regenerative braking at the steady power mode is calculated by the following equation:

$$GR_{cal\_Steady\,Power} = \frac{\omega_{TmIn}}{\omega_{TmOut}}$$

$$Regen_{Steady\,Power} = T_{motor} \times GR_{cal}$$

$GR_{cal\_SteadyPower}$ (=$GR_{cal}$): Gear ratio;

$\omega_{TmIn}$, $\omega_{TmOut}$: Transmission input rotation speed and output rotation speed;

$T_{motor}$: Driving motor torque; and $Regen_{SteadyPower}$: Amount of regenerative braking at steady power mode.

11. The method of claim 9, wherein the steady torque mode is a case in which a speed of the driving motor is smaller than a value obtained by subtracting a defined second delta rpm from the base speed, and the amount of regenerative braking at the steady torque mode is calculated by the following equation:

$$GR_{Diff} = GR_{after} - GR_{before}$$

$$\alpha = \frac{GR_{Diff}}{\Delta T_{Shift}}$$

$$GR_{cal\_SteadyTorque} = GR_{before} + \int_0^{T_{ShiftEnd}} \alpha dT$$

$$Regen_{SteadyTorque} = T_{motor} \times GR_{cal\_SteadyTorque}$$

$GR_{after}$, $GR_{before}$: Gear level after shift and before shift;

$GR_{Diff}$: Difference in gear level;

$\Delta T_{Shift}$: Shift time;

$\alpha$: Gear ratio slope at steady torque mode;

$T_{ShiftEnd}$: Shift ending time;

$$GR_{cal\_Steady\,Torque}\left(=\frac{\omega_{TmIn}}{\omega_{TmOut}}\right):$$

Gear ratio; and $Regen_{SteadyTorque}$: Amount of regenerative braking at steady torque mode.

12. The method of claim 9, wherein the conversion mode is a case in which a speed of the driving motor is smaller than a value obtained by adding a first delta rpm to the base speed and larger than a value obtained by subtracting a second delta rpm from the base speed as the conversion mode, and the amount of regenerative braking at the conversion mode is calculated by the following equation:

$$GR_{cal\_ModeChange} = GR_{before} + \int_0^{T_{ShiftEnd}} \gamma dT$$

$$Regen_{ModeChange} = T_{motor\_virtual} \times GR_{cal\_ModeChange}$$

$GR_{cal\_ModeChange}$: Calculated gear ratio at conversion mode;

$\int_0^{T_{ShiftEnd}} \gamma dT$: Slope (increase in gear ratio) of $\gamma$;

$\beta$: Gear ratio slope at conversion mode (mappable constant);

$\gamma$: Currently used slope in $\alpha$ and $\beta$;

$T_{motor\_virtual}$: Virtual motor torque;

$GR_{cal\_ModeChange}$: Calculated slope at conversion mode; and $Regen_{ModeChange}$: Amount of regenerative braking at conversion mode.

13. A method of controlling regenerative braking for an environmentally-friendly vehicle, comprising:

determining, by a hybrid controller, a presence of regenerative braking for the environmentally-friendly vehicle;

calculating, by the hybrid controller, a base speed (base rpm) of a driving motor of the environmentally-friendly vehicle and a vehicle speed variation of the environmentally-friendly vehicle at the time of the regenerative braking;

determining and dividing, by the hybrid controller, a steady torque area and a steady power area of the driving motor based on the calculated base speed and vehicle speed variation;

determining, by the hybrid controller, whether an operating mode of the driving motor is a steady power mode, a steady torque mode, or a conversion mode depending on the divided steady torque area or steady torque area and calculating an amount of regenerative braking based on the determined result; and controlling, by the hybrid controller, regenerative braking for the environmentally-friendly vehicle based on the calculated amount of regenerative braking, wherein the base speed of the driving motor is a speed when characteristics of the driving motor are changed from steady power to steady torque or the steady torque to the steady power at a speed at which the characteristics of the driving motor are changed.

14. The method of claim 13, wherein the vehicle speed variation is obtained by differentiating the vehicle speed of the environmentally-friendly vehicle.

15. The method of claim 13, wherein the steady torque mode is a case in which the vehicle speed variation is larger than a predetermined first set value as a case in which the deceleration is large.

16. The method of claim 13, wherein the steady power mode is a case in which the vehicle speed variation is smaller than a predetermined second set value as a case in which the deceleration is small.

17. The method of claim 13, wherein the conversion mode is a case in which the vehicle speed variation is smaller than a predetermined first set value and larger than a predetermined second set value.

* * * * *